(12) United States Patent
Nakashima et al.

(10) Patent No.: US 10,174,902 B2
(45) Date of Patent: Jan. 8, 2019

(54) VEHICLE LIGHTING FIXTURE

(71) Applicant: Stanley Electric Co., Ltd., Tokyo (JP)

(72) Inventors: Daisuke Nakashima, Tokyo (JP); Norifumi Imazeki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 6 days.

(21) Appl. No.: 15/436,302

(22) Filed: Feb. 17, 2017

(65) Prior Publication Data
US 2017/0241616 A1   Aug. 24, 2017

(30) Foreign Application Priority Data
Feb. 24, 2016 (JP) .................................. 2016-032738

(51) Int. Cl.
| | |
|---|---|
| *G02B 6/34* | (2006.01) |
| *F21S 43/235* | (2018.01) |
| *F21V 8/00* | (2006.01) |
| *F21S 43/20* | (2018.01) |
| *F21S 43/239* | (2018.01) |
| *F21S 43/245* | (2018.01) |
| *F21S 43/247* | (2018.01) |
| *F21S 43/31* | (2018.01) |
| *F21S 45/48* | (2018.01) |
| *F21Y 115/10* | (2016.01) |

(Continued)

(52) U.S. Cl.
CPC ........... *F21S 43/235* (2018.01); *F21S 43/239* (2018.01); *F21S 43/245* (2018.01); *F21S 43/247* (2018.01); *F21S 43/26* (2018.01); *F21S 43/31* (2018.01); *F21S 45/48* (2018.01); *G02B 6/0031* (2013.01); *G02B 6/0036* (2013.01); *F21S 43/14* (2018.01); *F21S 45/47* (2018.01); *F21Y 2115/10* (2016.08)

(58) Field of Classification Search
CPC ........ F21S 43/20; F21S 43/24; F21S 48/2212; F21S 48/2225; G02B 6/0031; G02B 6/0036
USPC ......................................................... 362/511
See application file for complete search history.

(56) References Cited

U.S. PATENT DOCUMENTS

| | | | | |
|---|---|---|---|---|
| 2010/0254152 A1* | 10/2010 | Taleb-Bendiab | ..... | B60Q 1/0035 362/551 |
| 2014/0160778 A1* | 6/2014 | Nakada | ................. | G02B 6/002 362/511 |

(Continued)

FOREIGN PATENT DOCUMENTS

JP         2013-45671 A        3/2013

*Primary Examiner* — Evan Dzierzynski
*Assistant Examiner* — Keith G Delahoussaye
(74) *Attorney, Agent, or Firm* — Kenealy Vaidya LLP

(57) ABSTRACT

A vehicle lighting fixture can achieve uniform projection of light while being capable of providing improved luxurious sense of projected light. The vehicle lighting fixture can include a housing, an outer lens configured to cover an opening of the housing to define a lighting chamber; and a light source and a light guiding lens located in the lighting chamber. The light guiding lens is configured so as to receive light from the light source and guide the light to a light exiting surface thereof for light projection. The light guiding lens has a functional surface which is opposite to the light exiting surface and can include a plurality of flute cuts configured to diffuse light and a plurality of prism cuts configured to reflect light. The plurality of prism cuts are arranged at random on the functional surface.

20 Claims, 6 Drawing Sheets

(51) Int. Cl.
   *F21S 43/14*     (2018.01)
   *F21S 45/47*     (2018.01)

(56) References Cited

U.S. PATENT DOCUMENTS

| 2015/0226901 A1* | 8/2015 | Lee | G02B 6/0036 |
| | | | 362/607 |
| 2015/0247613 A1* | 9/2015 | Doha | F21S 48/215 |
| | | | 362/507 |
| 2015/0316702 A1* | 11/2015 | Ilmonen | G02F 1/133603 |
| | | | 362/606 |
| 2016/0053962 A1* | 2/2016 | Akutsu | B60Q 1/0052 |
| | | | 362/511 |

* cited by examiner

VEHICLE LIGHTING FIXTURE

This application claims the priority benefit under 35 U.S.C. § 119 of Japanese Patent Application No. 2016-032738 filed on Feb. 24, 2016, which is hereby incorporated in its entirety by reference.

TECHNICAL FIELD

The presently disclosed subject matter relates to a vehicle lighting fixture including a light source and a light guiding lens configured to guide light from the light source and allow it to exit therethrough.

BACKGROUND ART

Some conventionally known vehicle lighting fixtures used as a rear lamp or a position lamp include a light source such as a light emitting diode (LED) and a light guiding lens having a reflective function portion and a light exiting surface. In this type of lighting fixtures, light emitted from the light source can enter the light guiding lens and be guided by the reflective function portion thereof in its longitudinal direction. During the guiding of light, the light can be reflected, thereby exiting through the light exiting surface. In this case, there may be formed a plurality of lens cuts in a surface of the light guiding lens opposite to the light exiting surface.

In a vehicle lighting fixture including such a light guiding lens, there is a large difference in luminance between a nearer position and a farther position from the light source, resulting in decreased uniform luminance in the light exiting surface.

In order to cope with this problem, there has been proposed a vehicle lighting fixture including a light guiding lens as shown in FIG. 1, for example, those disclosed in Japanese Patent Application Laid-Open No. 2013-045671.

FIG. 1 is a cross-sectional view illustrating part of a light guiding lens 101 of the vehicle lighting fixture proposed in Japanese Patent Application Laid-Open No. 2013-045671. The light guiding lens 101 is configured to include a plurality of prism cuts 101a formed in a surface (lower surface in FIG. 1) opposite to a light exiting surface (upper surface in FIG. 1) on a side near a not-illustrated light source and curved surfaces 101b concavely formed between the prism cuts 101a configured such that the respective curved surfaces 101b connect the adjacent ones of the prism cuts 101a.

In the light guiding lens 101 with such a configuration, light from the light source can be diffused by the curved surfaces 101b to reach the farther side of the light guiding lens 101 and be totally reflected within the light guiding lens 101. Then, the light diffused and/or reflected can be controlled by the prism cuts 101a in terms of light distribution so as to be projected through the light exiting surface of the light guiding lens 101 (upper surface in FIG. 1). Accordingly, the difference in luminance between the nearer position and the farther position from the light source can be reduced to improve the uniformity in luminance in the observed light exiting surface of the vehicle lighting fixture. The formation of such curved surfaces 101b concavely formed between the adjacent prism cuts 101a can properly diffuse the bundle of light rays to provide a light projection state with even luminance.

In the vehicle lighting fixture including the light guiding lens 101 as illustrated in FIG. 1, although the difference in luminance between the nearer position and the farther position from the light source can be reduced, the light projection is monotonous due to the uniform projection of light with a wider angle range of the light guiding lens 101, resulting in decrease of luxurious feeling as a vehicle lighting fixture.

SUMMARY

The presently disclosed subject matter as devised in view of these and other problems and features in association with the conventional art. According to an aspect of the presently disclosed subject matter, a vehicle lighting fixture can achieve uniform projection of light while being capable of providing improved luxurious sense of projected light.

According to another aspect of the presently disclosed subject matter, a vehicle lighting fixture can include a housing having a front opening; an outer lens configured to cover the front opening of the housing to define a lighting chamber together with the housing; a light source located in the lighting chamber; and a light guiding lens located in the lighting chamber, the light guiding lens including a light incident surface, a light exiting surface, and a functional surface opposite to the light exiting surface. The light guiding lens is configured so as to receive light from the light source through the light incident surface and guide the light to the light exiting surface for light projection. The functional surface of the light guiding lens can include a plurality of flute cuts configured to diffuse light and a plurality of prism cuts configured to reflect light, wherein the plurality of prism cuts are arranged at random on the functional surface.

In the vehicle lighting fixture with the above-mentioned configuration, the prism cuts of the light guiding lens can include projected and/or recessed prism cuts with respective different sizes, and the flute cuts can be arranged regularly.

The vehicle lighting fixture with the above-mentioned configurations can further include an inner lens disposed in front of the light guiding lens in a direction of light projection, and the inner lens can be configured to include a plurality of flute cuts for light diffusion formed in at least one of front and rear surfaces thereof.

In the vehicle lighting fixture with the above-mentioned configuration, the flute cuts of the inner lens can be formed in a semi-polygonal columnar shape (having a semi-polygonal cross section). In this configuration, the flute cuts can be formed in only the front or rear surface or both the front and rear surfaces.

According to the vehicle lighting fixture of the first and second configurations, the light having entered the light guiding lens from the light source can be diffused by the plurality of flute cuts formed in the functional surface of the light guiding lens, so that the resulting light can be projected through the light exiting surface as smaller intensity light in a wider range. Thus, this configuration can achieve the uniform luminance of the entire light exiting surface.

Furthermore, the light having entered the light guiding lens from the light from the light source can be reflected by the plurality of prism cuts that are arranged at random on the functional surface of the light guiding lens, so that the light with larger intensity can be projected through the light exiting surface as larger intensity light (reflected light) in a narrower range. This configuration can provide the light exiting surface with jewel-toned brightness (glitter sense) due to dispersed bright spots, i.e., improved luxurious sense.

According to the vehicle lighting fixture of the third and fourth configurations, the plurality of flute cuts provided in the front and/or rear surfaces of the inner lens can diffuse light projected from the light guiding lens. Thus, dispersed bright spots can be evened slightly to suppress the glare of the projected light, so that modesty luxurious sense of projected light can be achieved.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to a vehicle lighting fixture of the presently disclosed subject matter with reference to the accompanying drawings in accordance with exemplary embodiments.

Figure 1:
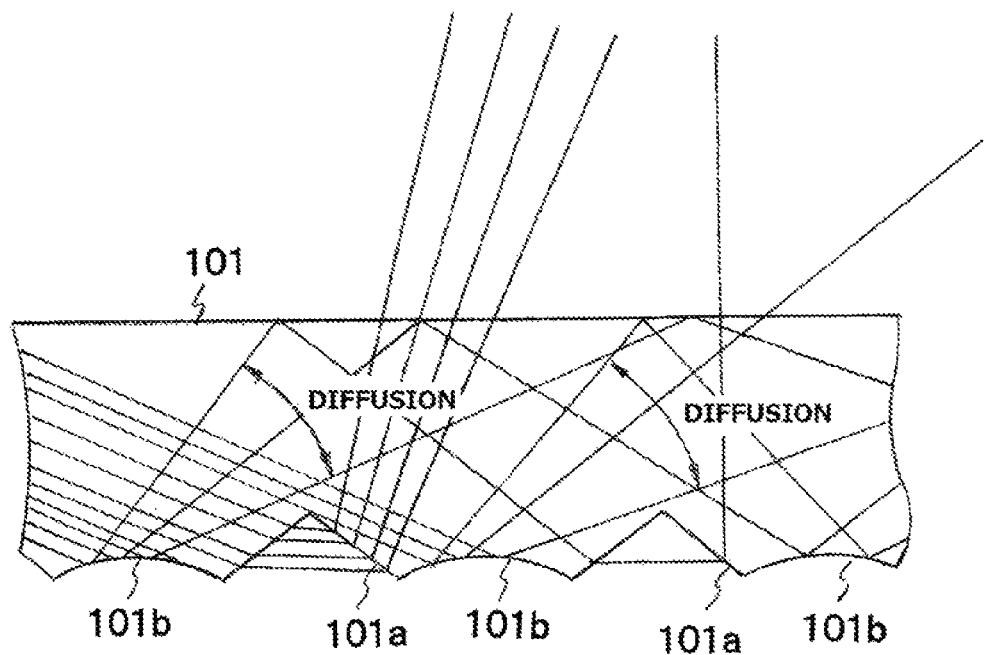
FIG. 1 is a cross-sectional view illustrating part of a light guiding lens of a vehicle lighting fixture proposed in Japanese Patent Application Laid-Open No. 2013-045671.
Figure 2:
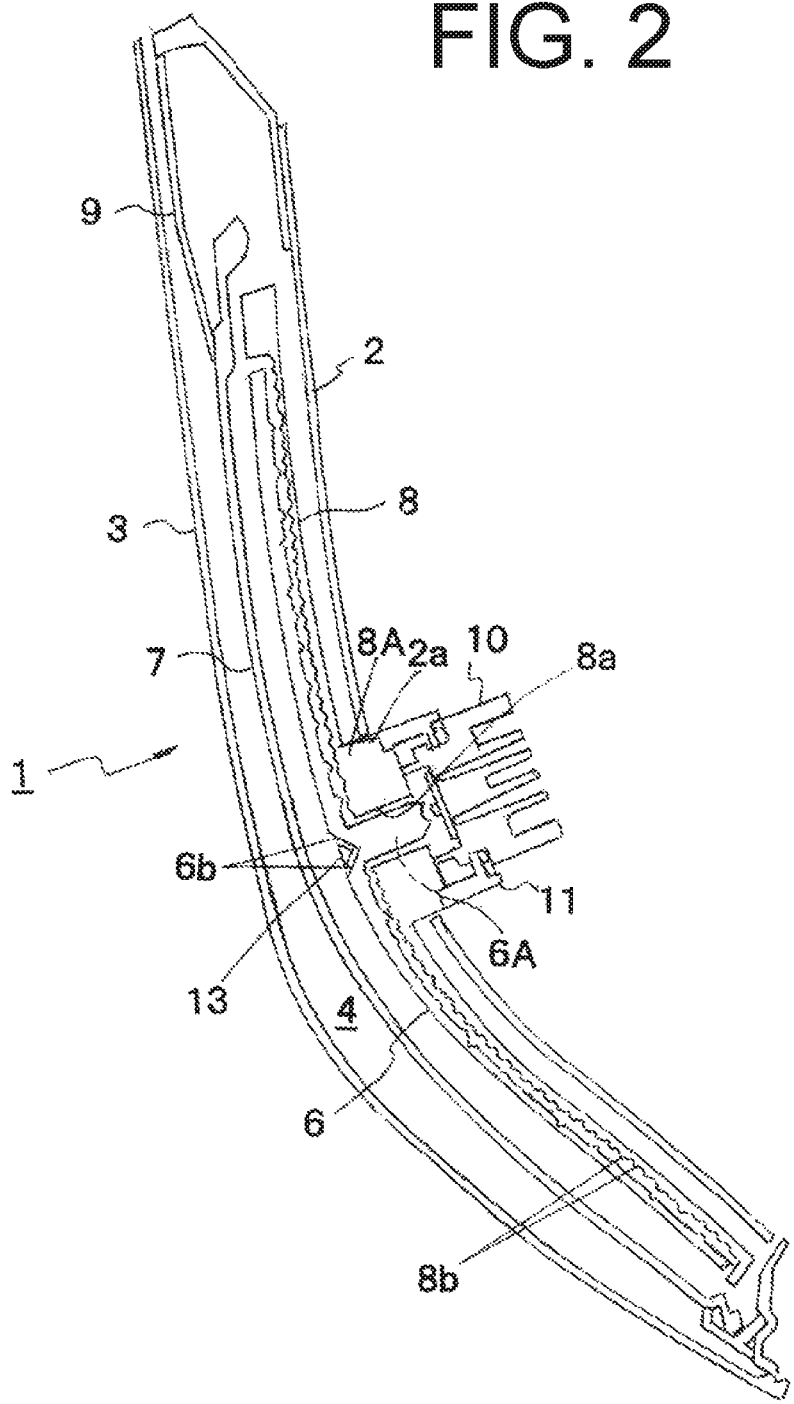
FIG. 2 is a horizontal cross-sectional view of a vehicle lighting fixture made in accordance with principles of the presently disclosed subject matter.
Figure 3:
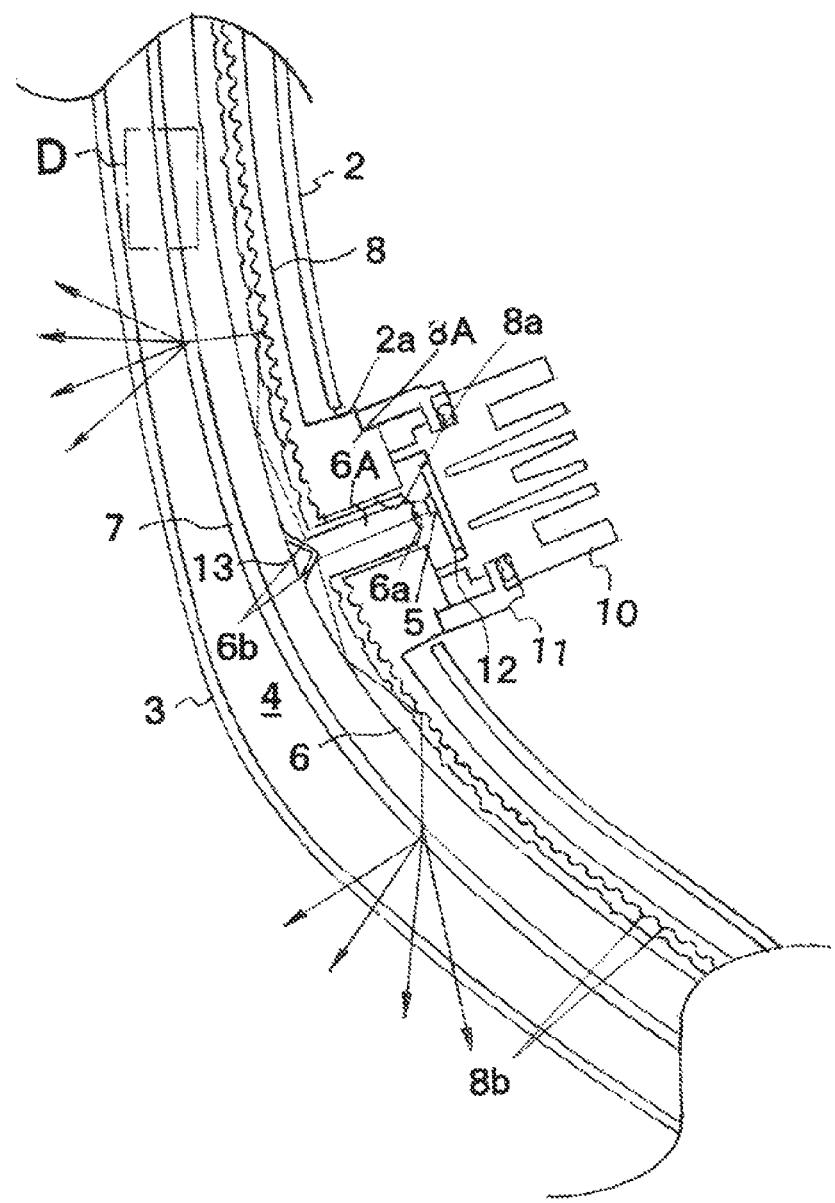
FIG. 3 is an enlarged horizontal cross-sectional view of essential portions of the vehicle lighting fixture in part illustrated in FIG. 2.
Figure 4:
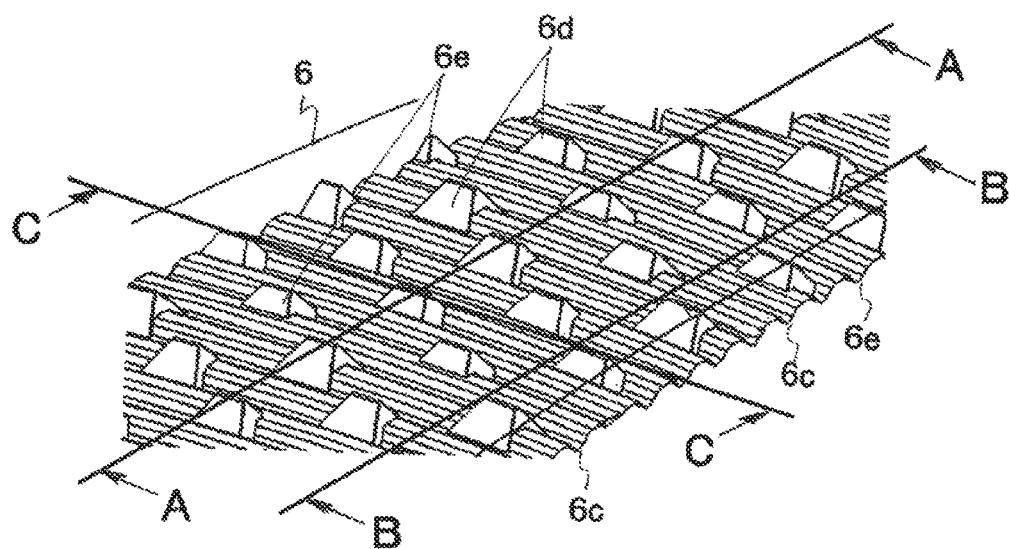
FIG. 4 is a perspective view illustrating part of a light guiding lens of the vehicle lighting fixture.
Figure 5:
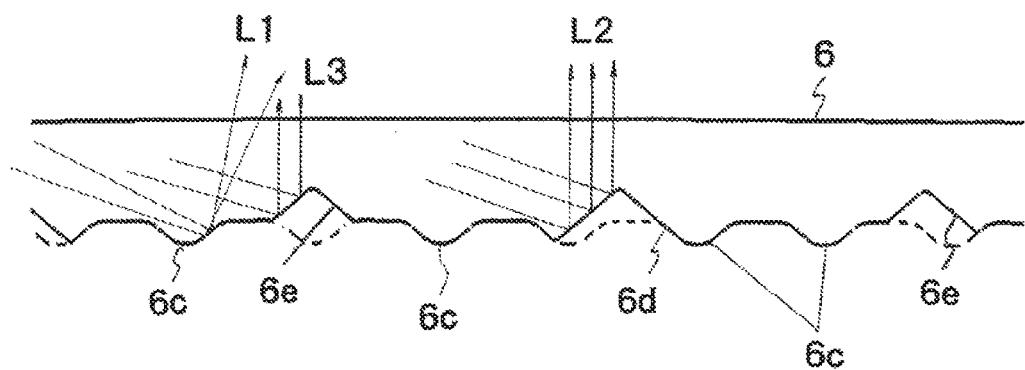
FIG. 5 is a cross-sectional view of the light guiding lens taken along line A-A of FIG. 4.
Figure 6:
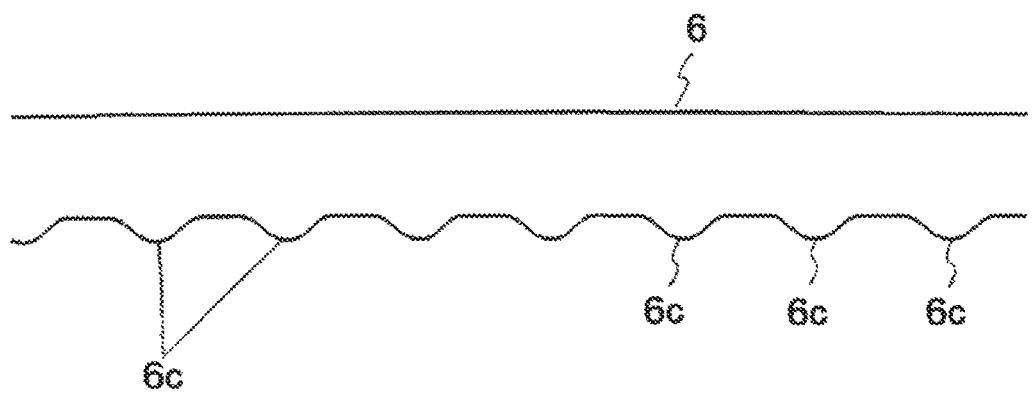
FIG. 6 is a cross-sectional view of the light guiding lens taken along line B-B of FIG. 4.
Figure 7:
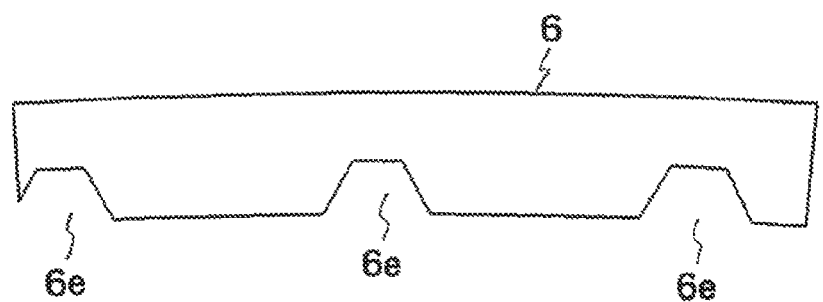
FIG. 7 is a cross-sectional view of the light guiding lens taken along line C-C of FIG. 4.
Figure 8:
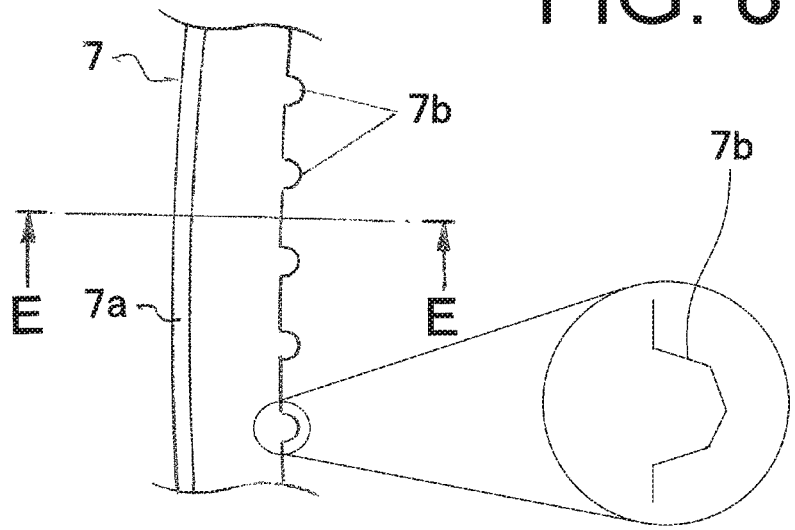
FIG. 8 is an enlarged cross-sectional view of an inner lens of the vehicle lighting fixture, in particular, a D portion thereof illustrated in FIG. 3, with enlarged flute cut 7*b* (having a semi-octagonal cross section) arranged on the rear surface thereof.
Figure 9:
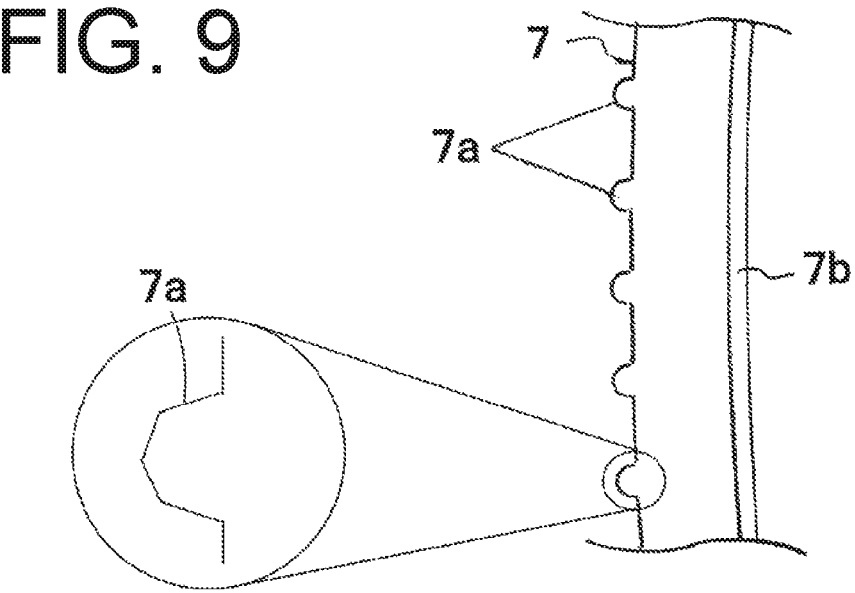
FIG. 9 is a cross-sectional view of the inner lens of the vehicle lighting fixture taken along line E-E of FIG. 8, with enlarged flute cut 7*a* (having a semi-octagonal cross section) arranged on the front surface thereof.

FIG. 2 is a horizontal cross-sectional view of a vehicle lighting fixture made in accordance with principles of the presently disclosed subject matter, and FIG. 3 is an enlarged horizontal cross-sectional view of essential portions of the vehicle lighting fixture in part illustrated in FIG. 2. FIG. 4 is a perspective view illustrating part of a light guiding lens of the vehicle lighting fixture, FIG. 5 is a cross-sectional view of the light guiding lens taken along line A-A of FIG. 4. FIG. 6 is a cross-sectional view of the light guiding lens taken along line B-B of FIG. 4, and FIG. 7 is a cross-sectional view of the light guiding lens taken along line C-C of FIG. 4. Furthermore, FIG. 8 is an enlarged cross-sectional view of an inner lens of the vehicle lighting fixture, in particular, a D portion thereof illustrated in FIG. 3, and FIG. 9 is a cross-sectional view of the inner lens of the vehicle lighting fixture taken along line E-E of FIG. 8.

The vehicle lighting fixture 1 according to the present exemplary embodiment can be used as a rear lamp to be disposed on both right and rear end portions of a vehicle body. Thus, the basic configurations thereof on the right and left end portions are symmetrically the same, and one of them will be illustrated as an example.

The vehicle lighting fixture 1 serving as a rear lamp can include, as illustrated in FIG. 2, a housing 2 having a front opening and formed along an outer shape of the vehicle body in an arc shape as viewed in a plan view, and a transparent outer lens 3 configured to cover the front opening of the housing 2 and have a similar shape to that of the housing 2 to define a lighting chamber 4 together with the housing 2. Furthermore, the vehicle lighting fixture 1 can include a light source 5 (such as an LED as illustrated in FIG. 3) located in the lighting chamber 4; and a light guiding lens 6 located in the lighting chamber 4. Further included are an inner lens 7 disposed in front of the light guiding lens 6 in a direction of light projection (on the front side), a reflector 8 disposed in rear of the light guiding lens 6, and an extension 9 configured to cover the periphery of the inner lens 7, which are also housed in the lighting chamber 4.

The housing 2 can be molded from an opaque resin, which is not transparent, in an arc shape when viewed in a plan view. As illustrated in FIGS. 2 and 3 the housing 2 can be provided with a hole 2*a* formed in a middle portion of its rear surface in a longitudinal direction thereof. The reflector 8 can include a projected portion 8A in a middle portion of its rear surface in its longitudinal direction (corresponding to the position of the hole 2*a* of the housing 2). The projected portion 8A can penetrate through the hole 2*a* of the housing 2. The projected portion 8A can have an end portion exposed from the housing 2 outside, to which an LED socket 10 can be attached through a bracket 11. The LED socket 10 can be a member serving also as a heat sink. The LED socket 10 can have an end face opposite to the projected portion 8A of the reflector 8, to which a substrate 12 (see FIG. 3) can be attached. The LED 5 can be mounted on the substrate 12. Furthermore, the projected portion 8A of the reflector 8 can have a hole 8*a* corresponding to the opposed LED 5.

Each of the light guiding lens 6, the inner lens 7, and the reflector 8 can be formed in an arc shape, as viewed in a plan view, along the shapes of the housing 2 and the outer lens 3. The surface of the reflector 8 opposed to the light guiding lens 6 can function as a reflective surface, which has been subjected to a reflective treatment, such as aluminum deposition. Furthermore, the reflective surface of the reflector 8 can have a plurality of flute cuts 8*b* in a vertical direction (a direction perpendicular to the paper surface of FIGS. 2 and 3) along its longitudinal direction side by side. The flute cuts 8*b* can have a semi-circular cross section and be used for light diffusion.

The light guiding lens 6 can be formed from a transparent resin, such as an acrylic resin, having a high light guiding performance. The light guiding lens 6 can be provided with a projected light incident portion 6A formed in a middle portion of its rear surface in a longitudinal direction thereof and directed rearward and substantially perpendicular to the elongated main body of the light guiding lens 6. The light incident portion 6A can be inserted into the hole 8*a* of the projected portion 8A of the reflector 8 so as to be opposed to the LED 5, and so the light incident portion 6A can have an end face that serves as a light incident surface 6*a* opposed to the LED 5. In this case, the light incident surface 6*a* can be designed to have a recessed curved surface.

Furthermore, the light guiding lens 6 can include a light exiting surface as a front surface. As illustrated in detail in FIG. 3, a V-shaped reflective cut 6*b* can formed in the light exiting surface (front surface) in a position opposite to the light incident portion 6A. In front of the reflective cut 6*b*, a shade 13 having a triangular cross section in a plan view can be disposed to prevent light from being leaked from the peripheral edges of the reflective cut 6b. The shade 13 can be formed from an opaque resin having a high light-shielding performance.

The light guiding lens 6 according to this exemplary embodiment can further include a functional surface opposite to the light exiting surface (rear surface). The functional surface of the light guiding lens 6 can include a plurality of flute cuts 6c configured to diffuse light and have a semicircular cross section (semi-circular column). Specifically, as illustrated in FIG. 4, each of the flute cuts 6c can be linearly formed along line C-C in FIG. 4 (along a direction perpendicular to the paper surface of FIG. 6) as a semi-circular columnar projection projected from the functional surface of the light guiding lens 6. The plurality of flute cuts 6c can be arranged regularly at constant pitches along line B-B in 4 (along a left-to-right direction in FIG. 6).

As illustrated in FIGS. 4, 5, and 7, the functional surface of the light guiding lens 6 can include a plurality of prism cuts 6d and 6e configured to reflect light. Furthermore, the plurality of prism cuts 6d and 6e can be arranged at random on the functional surface and include projected and/or recessed prism cuts 6d and 6e with respective different sizes. Specifically, each of the prism cuts 6d and 6e can have a recessed triangular cross section as illustrated in FIG. 4 which shows a cross-sectional view of FIG. 3 taken along line A-A. Furthermore, each of the prism cuts 6d and 6e can have a recessed trapezoidal cross section as illustrated in FIG. 7 which shows a cross-sectional view of FIG. 3 taken along line C-C. Note that FIG. 7 shows the cross sections of smaller ones 6e of the prism cuts. The total number of the small and large prism cuts 6d and 6e can be set to be smaller than the number of the flute cuts 6c in this exemplary embodiment.

In this exemplary embodiment, the flute cuts 6c and the prism cuts 6d and 6e are formed only in the functional surface (rear surface) of the light guiding lens 6, however, this is not limitative. These flute cuts and prism cuts may be formed in the light exiting surface (front surface). Furthermore, in this exemplary embodiment, the flute cuts 6c are formed to be projected while the prism cuts 6d and 6e are formed to be recessed. This configuration is not limitative, and the flute cuts 6c are formed to be recessed while the prism cuts 6d and 6e are formed to be projected. Thus, these cross-sectional shapes of the flute cuts and prism cuts may be optionally designed according to the required optical specification as the vehicle lighting fixture.

The inner lens 7 disposed in front of the light guiding lens 6 in the light projection direction (on the front side) can be formed from a transparent resin, such as an acrylic resin like the light guiding lens 6. The inner lens 7 can be provided with a plurality of flute cuts 7a and 7b for light diffusion on its front and rear surfaces as illustrated in FIGS. 8 and 9 so that the flute cuts 7a are formed in a direction perpendicular to a direction in which the flute cuts 7b are formed. Specifically, as illustrated in FIGS. 8 and 9 (in particular, encircled illustrations), the flute cuts 7a and 7b formed on the front and rear surfaces of the inner lens 7 respectively can be formed in a projected semi-polygonal columnar shape (having a semi-polygonal cross section). The semi-polygonal shape may include a semi-regular octagonal shape and a semi-regular decagonal shape. They can be regularly arranged in respective directions. Thus, when seen from the front surface of the transparent inner lens 7, the flute cuts 7a and 7b are appeared to form a lattice shape.

Not that the extension 9 may be formed from an opaque resin that cannot transmit light.

A description will now be given of how to project light from the vehicle lighting fixture with this configuration. When a current is supplied to the LED 5 disposed in the longitudinal center in the lighting chamber 4 to emit light, the light can be incident on the light incident surface 6a formed in the end surface of the light incident portion 6A of the light guiding lens 6 as illustrated in FIG. 3 by an optical path line. Then, the light can straightforwardly travel through the light incident portion 6A of the light guiding lens 6 and then be reflected by the V-shaped reflective cut 6b so that the travelling direction is bent by substantially 90 degrees. The light rays thus can be directed along the light guiding lens 6 in the right and left directions toward both longitudinal ends of the light guiding lens 6 while being totally reflected within the light guiding lens 6. During this travelling (guiding), part of the light rays can be reflected by the plurality of flute cuts 6c and large and small prims cuts 6d and 6e, which are formed in the functional surface (rear surface) of the light guiding lens 6, toward the light exiting surface (front surface), so that the light rays can be projected through the light exiting surface.

More specifically, as illustrated in FIG. 5, part L1 of the light rays traveling through the light guiding lens 6 can be diffused by the plurality of flute cuts 6c formed in the functional surface (rear surface) of the light guiding lens 6, so that the resulting part L1 of the light rays can be projected through the light exiting surface as smaller intensity light (diffused light) in a wider range. This configuration can achieve the uniform luminance of the entire light exiting surface.

Furthermore, as illustrated in FIG. 5, other parts L2 and L3 of the light rays traveling through the light guiding lens 6 can be reflected by the plurality of prism cuts 6d and 6e, which are arranged at random on the functional surface of the light guiding lens 6, so that the parts L2 and L3 of the light rays can be projected through the light exiting surface as larger intensity light (reflected light) in a narrower range. This configuration can provide the light exiting surface with jewel-toned brightness (glitter sense) due to dispersed bright spots, i.e., improved luxurious sense. In this case, the prism cuts 6d and 6e have different sizes of trapezoidal shapes so that the light reflected from the larger prism cuts 6d can have larger intensity of light than that reflected from the smaller prism cuts 6e. This configuration can enhance the glitter sense of the vehicle lighting fixture.

The parts L1, L2, and L3 of the light rays projected through the light exiting surface of the light guiding lens 6 can pass through the inner lens 7 and the outer lens 3 to the outside of the vehicle body (in this case, rearward because of the vehicle lighting fixture serving as the rear lamp). In this case, the parts L1, L2, and L3 of the light rays projected through the light exiting surface of the light guiding lens 6 can pass through the inner lens 7 while the plurality of flute cuts 7a and 7b formed in the front and rear surfaces of the inner lens 7 in a lattice shape can diffuse the projected light rays. Thus, dispersed bright spots from the prism cuts 6d and 6e that may provide glitter sense can be evened slightly to suppress the glare of the projected light, so that modesty luxurious sense of projected light can be achieved.

The plurality of flute cuts 7a and 7b formed in the front and rear surfaces of the inner lens 7 can be formed in a semi-polygonal columnar shape (having a semi-polygonal cross section) as illustrated in FIGS. 8 and 9 (in particular, encircled enlarged illustrations in FIGS. 8 and 9). Thus, the light can be diffused by the polygonal surfaces of the flute cuts 7a and 7b. In this case, the light rays reflected by the prism cuts 6d and 6e having different sizes of trapezoidal shapes can be diffused in the vertical direction by the polygonal surfaces of the flute cuts 7b formed in the rear surface of the inner lens 7 while the light rays reflected by the prism cuts 6d and 6e can be diffused in the horizontal direction by the polygonal surfaces of the flute cuts 7a formed in the front surface of the inner lens 7. In this case, the light rays reflected by the plurality of prism cuts 6d and 6e may pass through the front-side flute cuts 7a after diffused by the rear-side flute cuts 7b. When the light rays are projected after these configuration, the light rays reflected by the large and small prism cuts 6d and 6e having trapezoidal shapes and entering the inner lens 7 can be diffused by the polygonal surfaces of the front-side and rear-side flute cuts 7a and 7b. If the semi-polygonal shape is a semi-regular octagonal shape as illustrated, the four surfaces of the rear-side flute cuts 7b and the four surfaces of the front-side flute cuts 7a can contribute to the diffusion of the reflected light rays from the prism cuts 6d and 6e. The diffusion by the four surfaces×the four surfaces, or the diffusion by 16 surfaces or more, can achieved, thereby enhancing the glitter sense of dispersed bright spots. Specifically, this configuration can provide the light exiting surface with jewel-toned brightness (glitter sense) due to dispersed bright spots, i.e., improved luxurious sense as compared with the case where the dispersed bright spots are achieved only by a simple light guiding plate.

If a specific light distribution property as a rear lamp or stop lamp is required, the design change can be achieved by changing the directions of the flute cuts 7a and 7b formed in the front and rear surfaces of the inner lens 7, the shapes thereof (for example, a semi-circular column), etc.

For example, suppose a case where the flute cuts are formed only in the front surface of the inner lens 7. In this case, the glitter sense is somewhat decreased, but the flute cuts 7a (with the four polygonal surface, for example) in the front surface of the inner lens 7 can sufficiently enhance the glitter sense of dispersed bright spots.

As discussed above, the vehicle lighting fixture 1 made in accordance with the principles of the presently disclosed subject matter can achieve uniform projection of light while being capable of providing improved luxurious feeling.

It should be noted that some part of light rays traveling through the light guiding lens 6 may be leaked therefrom to the rear side. However, in this case, the leaked light rays can be reflected by the reflective surface of the reflector 8 forward to re-enter the light guiding lens 6. This configuration can increase the light utilization efficiency. Also note that the reflective surface of the reflector 8 can have the plurality of flute cuts 8b, and thus, the light rays reflected and diffused by the reflector 8 by means of the reflective surface and the flute cuts 8b can again enter the wider regions of the light guiding lens 6. Accordingly, the light rays can be again utilized for light projection.

Examples of the vehicle lighting fixtures may include, in addition to the rear lamp, a stop lamp, a turn signaling lamp, a positioning lamp, a day running lamp (DRL), and other vehicle lighting fixtures including a light guiding system with a light guiding lens.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting fixture comprising:
   a lamp housing having a front opening;
   an outer lens configured to cover the front opening of the housing to define a lighting chamber together with the housing;
   a light source located in the lighting chamber; and
   a light guiding lens located in the lighting chamber, the light guiding lens including a light incident surface, a light exiting surface, and a functional surface opposite to the light exiting surface, wherein:
   the light guiding lens is configured so as to receive light from the light source through the light incident surface and guide the light to the light exiting surface for light projection;
   the functional surface of the light guiding lens includes a plurality of flute cuts configured to diffuse light and a plurality of prism cuts configured to reflect light;
   the flute cuts each extend in a direction intersecting a lengthwise direction of the light guiding lens and have one of a projected shape and a recessed shape with a certain length and are arranged at a constant pitch within an area of the functional surface of the light guiding lens; and
   the plurality of prism cuts each have a length smaller than the length of the flute cuts extending in the direction intersecting the lengthwise direction and are arranged in a varying order on the functional surface both in the lengthwise direction and in the direction intersecting the lengthwise direction within the area where the flute cuts are arranged.

2. The vehicle lighting fixture according to claim 1, wherein the prism cuts of the light guiding lens include at least any of a projected prism cut and a recessed prism cut with respective different sizes, and
   the flute cuts are arranged regularly.

3. The vehicle lighting fixture according to claim 2, wherein
   the plurality of flute cuts and the plurality of prism cuts are configured to have one of,
   a configuration wherein the flute cuts are projected from the functional surface and the prism cuts are recessed from the functional surface, and
   a configuration the flute cuts are recessed from the functional surface and the prism cuts are projected from the functional surface.

4. The vehicle lighting fixture according to claim 2, further comprising an inner lens disposed in front of the light guiding lens in a direction of light projection, wherein
   the inner lens is configured to include a plurality of flute cuts for light diffusion formed in at least one of front and rear surfaces thereof.

5. The vehicle lighting fixture according to claim 4, wherein
   the plurality of flute cuts and the plurality of prism cuts are configured to have one of,
   a configuration wherein the flute cuts are projected from the functional surface and the prism cuts are recessed from the functional surface, and
   a configuration the flute cuts are recessed from the functional surface and the prism cuts are projected from the functional surface.

6. The vehicle lighting fixture according to claim 4, wherein the flute cuts of the inner lens are formed in both the front and rear surfaces.

7. The vehicle lighting fixture according to claim 4, wherein the flute cuts of the inner lens are formed in a semi-polygonal columnar shape.

8. The vehicle lighting fixture according to claim 7, wherein
the plurality of flute cuts and the plurality of prism cuts are configured to have one of,
a configuration wherein the flute cuts are projected from the functional surface and the prism cuts are recessed from the functional surface, and
a configuration the flute cuts are recessed from the functional surface and the prism cuts are projected from the functional surface.

9. The vehicle lighting fixture according to claim 7, wherein the flute cuts of the inner lens are formed in both the front and rear surfaces.

10. The vehicle lighting fixture according to claim 1, further comprising an inner lens disposed in front of the light guiding lens in a direction of light projection, wherein
the inner lens is configured to include a plurality of flute cuts for light diffusion formed in at least one of front and rear surfaces thereof.

11. The vehicle lighting fixture according to claim 10, wherein
the plurality of flute cuts formed in the inner lens extend in a direction orthogonal to the direction in which the plurality of flute cuts formed in the functional surface of the light guiding lens extend to form a lattice shape together.

12. The vehicle lighting fixture according to claim 10, wherein
the plurality of flute cuts and the plurality of prism cuts are configured to have one of,
a configuration wherein the flute cuts are projected from the functional surface and the prism cuts are recessed from the functional surface, and
a configuration the flute cuts are recessed from the functional surface and the prism cuts are projected from the functional surface.

13. The vehicle lighting fixture according to claim 12, wherein
the plurality of flute cuts formed in the inner lens extend in a direction orthogonal to the direction in which the plurality of flute cuts formed in the functional surface of the light guiding lens extend to form a lattice shape together.

14. The vehicle lighting fixture according to claim 10, wherein the flute cuts of the inner lens are formed in a semi-polygonal columnar shape.

15. The vehicle lighting fixture according to claim 14, wherein the flute cuts of the inner lens are formed in both the front and rear surfaces.

16. The vehicle lighting fixture according to claim 14, wherein
the plurality of flute cuts and the plurality of prism cuts are configured to have one of,
a configuration wherein the flute cuts are projected from the functional surface and the prism cuts are recessed from the functional surface, and
a configuration the flute cuts are recessed from the functional surface and the prism cuts are projected from the functional surface.

17. The vehicle lighting fixture according to claim 14, wherein
the plurality of flute cuts formed in the inner lens extend in a direction orthogonal to the direction in which the plurality of flute cuts formed in the functional surface of the light guiding lens extend to form a lattice shape together.

18. The vehicle lighting fixture according to claim 10, wherein the flute cuts of the inner lens are formed in both the front and rear surfaces.

19. The vehicle lighting fixture according to claim 18, wherein
the plurality of flute cuts formed in the inner lens extend in a direction orthogonal to the direction in which the plurality of flute cuts formed in the functional surface of the light guiding lens extend to form a lattice shape together.

20. The vehicle lighting fixture according to claim 1, wherein
the plurality of flute cuts and the plurality of prism cuts have one of,
a configuration wherein the flute cuts are projected from the functional surface and the prism cuts are recessed from the functional surface, and
a configuration wherein the flute cuts are recessed from the functional surface and the prism cuts are projected from the functional surface.

* * * * *